(12) United States Patent
Lawrence et al.

(10) Patent No.: US 8,122,699 B2
(45) Date of Patent: Feb. 28, 2012

(54) ECOLOGY VALVE FUEL RETURN SYSTEM OPERABLE IN FLUID ISOLATION DURING GAS TURBINE ENGINE SHUT-DOWN

(75) Inventors: David Lawrence, South Bend, IN (US); Paul Futa, North Liberty, IN (US); Larry Portolese, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 772 days.

(21) Appl. No.: 12/327,480

(22) Filed: Dec. 3, 2008

(65) Prior Publication Data
US 2010/0132368 A1    Jun. 3, 2010

(51) Int. Cl.
F02G 3/00 (2006.01)

(52) U.S. Cl. ....................... 60/39.094; 60/734

(58) Field of Classification Search ............... 60/39.094, 60/39.281, 734, 739
See application file for complete search history.

(56) References Cited

U.S. PATENT DOCUMENTS

| | | | |
|---|---|---|---|
| 2,846,845 A * | 8/1958 | Parker | 60/39.094 |
| 5,809,771 A | 9/1998 | Wernberg | |
| 6,195,978 B1 * | 3/2001 | Futa, Jr. | 60/39.094 |
| 6,314,998 B1 | 11/2001 | Futa, Jr. et al. | |
| 6,484,510 B2 | 11/2002 | Futa, Jr. et al. | |
| 6,619,025 B2 | 9/2003 | Wernberg | |
| 6,892,544 B2 | 5/2005 | Futa, Jr. et al. | |
| 7,093,420 B2 | 8/2006 | Futa, Jr. et al. | |
| 7,200,985 B2 * | 4/2007 | Tuttle et al. | 60/39.094 |
| 2005/0166572 A1 * | 8/2005 | Futa et al. | 60/39.094 |
| 2005/0279079 A1 * | 12/2005 | Baryshnikov et al. | 60/39.094 |
| 2010/0037612 A1 * | 2/2010 | Futa et al. | 60/734 |
| 2010/0058733 A1 * | 3/2010 | Lawrence et al. | 60/39.094 |

* cited by examiner

*Primary Examiner* — Louis Casaregola
*Assistant Examiner* — Phutthiwat Wongwian
(74) *Attorney, Agent, or Firm* — Ingrassia Fisher & Lorenz, P.C.

(57) ABSTRACT

An ecology valve (EV) fuel return system includes a housing assembly, an ecology valve, and a fuel routing assembly. The ecology valve includes an EV piston slidably disposed within the housing assembly for movement between a fuel storage position and a fuel return position, a fuel storage chamber defined by the EV piston and the housing assembly, and an EV control chamber defined by the EV piston and the housing assembly. The fuel routing assembly, which is fluidly coupled to the EV control chamber and to the fuel storage chamber, is configured to route fuel: (i) from the fuel storage chamber to a fuel supply system when a gas turbine engine (GTE) is in a start-up mode, and (ii) from the first fuel manifold and from the EV control chamber to the fuel storage chamber when the GTE is in a shut-down mode.

20 Claims, 3 Drawing Sheets

US 8,122,699 B2

ECOLOGY VALVE FUEL RETURN SYSTEM OPERABLE IN FLUID ISOLATION DURING GAS TURBINE ENGINE SHUT-DOWN

TECHNICAL FIELD

The present invention relates generally to aircraft fuel control systems and, more particularly, to an ecology valve (EV) fuel return system suitable for use in conjunction with a gas turbine engine (GTE) that receives fuel from a fuel tank wherein the EV return system is operable even when fluidly isolated from the fuel tank during GTE shut-down.

BACKGROUND

Auxiliary power units (APUs) are commonly deployed on aircraft to provide an efficient source of electrical power, pressurized air, and/or hydraulic pressure. Among other components, an APU may include a gas turbine engine (GTE) having one or more fuel manifolds disposed within a combustion chamber. The fuel supply system includes, amongst other components, a fuel tank, a boost pump, a fuel supply pump, and a fuel metering valve. The manifolds include a series of nozzles (e.g., air blast nozzles and/or atomizer nozzles) that spray the burn fuel into the APU's combustion chamber. The resulting air-fuel mixture is then ignited to drive the rotation of one or more air turbines downstream of the combustion chamber. When including a GTE having multiple fuel manifolds (e.g., a primary manifold and a secondary manifold), the APU may be further equipped with a fuel divider system fluidly coupled between the fuel supply system and the GTE's manifolds. The fuel divider system apportions fuel between the primary and secondary manifold in accordance with a predetermined flow schedule (e.g., "quick fill logic") to optimize GTE operation; e.g., to achieve optimal engine light-off conditions in a timely manner.

Due, at least in part, to recent regulations, it is now common for a GTE to be further equipped with an ecology valve (EV) fuel return system fluidly coupled to the GTE's fuel manifold or manifolds. The EV fuel return system is configured to remove a predetermined volume of burn fuel from the fuel manifolds upon cessation of GTE operation. Certain known piston/reservoir EV fuel return systems are further configured such that the withdrawn burn fuel is returned directly to the fuel manifolds for immediate combustion when GTE operation is again initiated (i.e., during engine start-up). Advantageously, by removing a predetermined volume of burn fuel from the fuel manifolds upon GTE shut-down, such piston/reservoir EV fuel return systems decrease the volume of fuel available for vaporization to the atmosphere and deter coking of the manifold nozzles. However, by returning this withdrawn burn fuel directly to the fuel manifold when GTE operation is again initiated, such piston/reservoir EV fuel return systems may disrupt the GTE's predetermined flow schedule and thereby comprise ideal engine light-off conditions.

Considering the above, it is desirable to provide an ecology valve fuel return system that avoids disruption of a predetermined flow schedule when returning fuel previously withdrawn from one or more fuel manifolds upon, or shortly after, GTE start-up. Ideally, such an EV fuel return system would be operable even when fluidly isolated from the fuel tank due to: (i) the closing of a shut-off valve between the EV fuel return system and the fuel tank, or (ii) high return pressures resulting from, for example, the inclusion of a relatively strong fuel boost pump within the fuel supply system. Other desirable features and characteristics of the present invention will become apparent from the subsequent Detailed Description and the appended claims, taken in conjunction with the accompanying drawings and this Background.

BRIEF SUMMARY

An ecology valve (EV) fuel return system is provided for use in conjunction with a fuel supply system and a gas turbine engine (GTE) including at least a first fuel manifold. In one embodiment, the EV fuel return system includes a housing assembly, an ecology valve, and a fuel routing assembly. The ecology valve includes an EV piston slidably disposed within the housing assembly for movement between a fuel storage position and a fuel return position, a fuel storage chamber defined by the EV piston and the housing assembly, and an EV control chamber defined by the EV piston and the housing assembly. The fuel within the EV control chamber acts on the EV piston in opposition to the fuel within the fuel storage chamber. The fuel routing assembly is fluidly coupled to the EV control chamber and to the fuel storage chamber. The fuel routing assembly is configured to route fuel: (i) from the fuel storage chamber to the fuel supply system when the GTE is in a start-up mode, and (ii) from the first fuel manifold and from the EV control chamber to the fuel storage chamber when the GTE is in a shut-down mode.

A fuel control assembly is also provided for use in conjunction with a gas turbine engine (GTE) having at least a first fuel manifold. In one embodiment, the fuel control assembly includes an ecology valve (EV) fuel return system and a fuel supply system configured to supply pressurized fuel to the first fuel manifold. The ecology valve (EV) fuel return system includes a housing assembly, an EV piston, and a fuel routing assembly. The housing assembly has a fuel return outlet and a first manifold inlet. The fuel return outlet is fluidly coupled to the fuel supply system, and the first manifold inlet is configured to be fluidly coupled to the first fuel manifold. The EV piston is slidably disposed within the housing assembly and movable between a fuel storage position and a fuel return position. The EV piston cooperates with the housing assembly to define a fuel storage chamber and an EV control chamber therein. The fuel routing assembly is fluidly coupled to the fuel storage chamber, the EV control chamber, the first manifold inlet, and the fuel return outlet. The fuel routing assembly is configured to route fuel: (i) from the fuel storage chamber to the fuel return outlet when the GTE is in a start-up mode, and (ii) from the EV control chamber and from the first manifold inlet into the fuel storage chamber when the GTE is in a shut-down mode.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
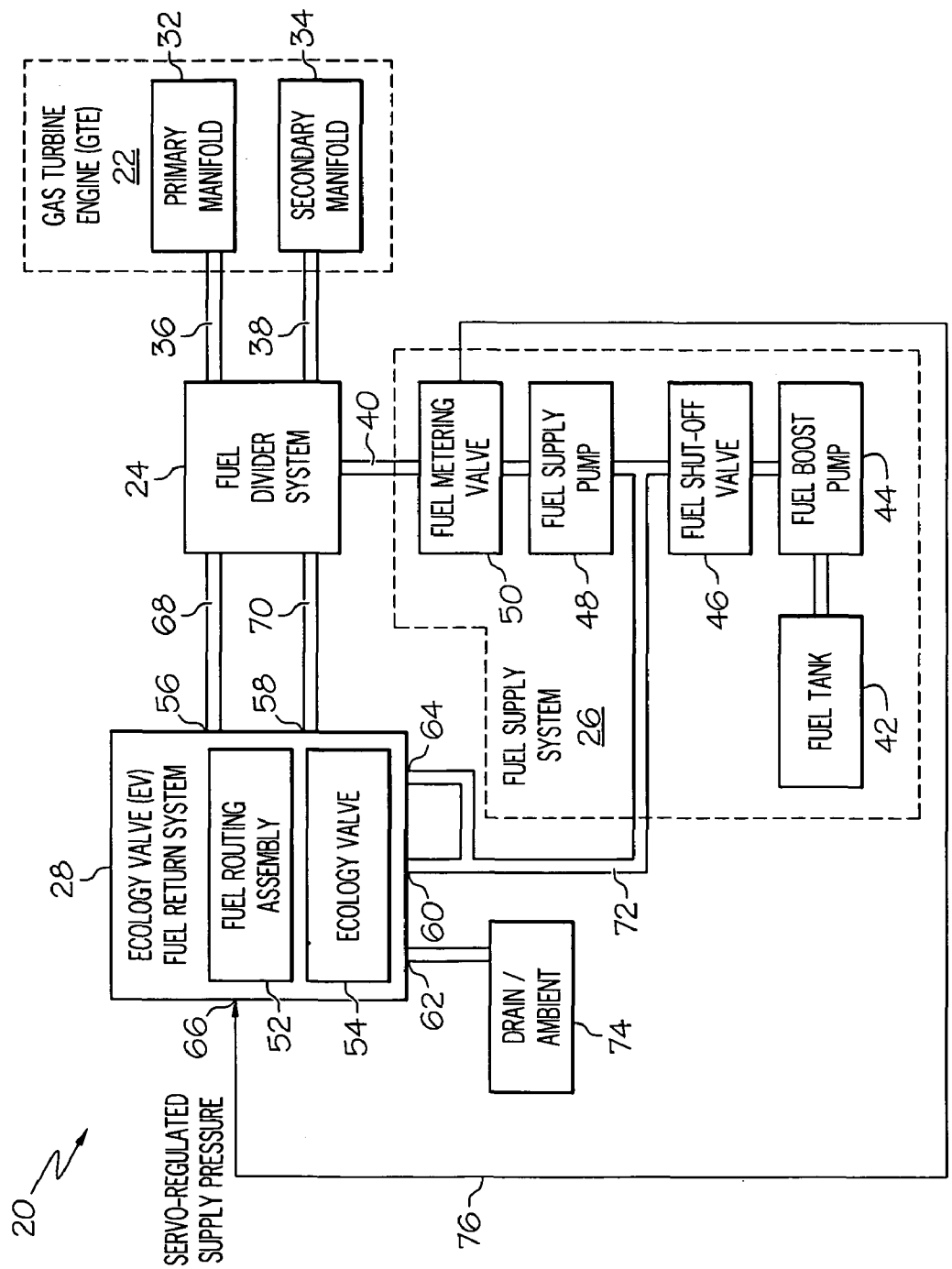
FIG. 1 is a simplified schematic of a fuel control assembly including an ecology valve fuel return system in accordance with an exemplary embodiment.

FIG. 1 is a simplified block diagram of an exemplary fuel control assembly 20 suitable for use in conjunction with a gas turbine engine (GTE) 22 of the type commonly deployed on an aircraft. GTE 22 may be utilized as, for example, a jet engine to provide propulsion to a host aircraft. Alternatively, GTE 22 may be included within an auxiliary power unit (APU) utilized to provide electrical power, pressurized air, and/or hydraulic pressure to various systems aboard the aircraft. For purposes of explanation, fuel control assembly 20 is shown in FIG. 1 as including three main sub-systems: (i) a fuel divider system 24, (ii) a fuel supply system 26, and (iii) an ecology valve (EV) fuel return system 28. Although illustrated as a distinct entity in FIG. 1, EV fuel return system 28 may be integrated with (e.g., incorporated into the same housing as) fuel divider system 24 and/or fuel supply system 26 in actual implementations of fuel control assembly 20.

GTE 22 may include any suitable number of fuel manifolds. In the illustrated example, GTE 22 includes a primary manifold 32 and a secondary manifold 34. Manifolds 32 and 34 are fluidly coupled to fuel divider system 24 via first and second flow passages 36 and 38, respectively. Fuel divider system 24 is, in turn, fluidly coupled to fuel supply system 26 via a third flow passage 40. As indicated in FIG. 1, fuel supply system 26 may include a fuel tank 42, a fuel boost pump 44, a fuel shut-off valve 46 (also commonly referred to as a "foot valve"), a fuel supply pump 48, and a fuel metering valve 50 coupled in flow series. Fuel supply system 26 may also include various other components (e.g., one or more pressure relief valves, pressurizing valves, filters, bypass valves, etc.) that are conventionally known and not shown in FIG. 1 for clarity including, for example, a second shut-off valve downstream of fuel metering valve 50. In addition, the components of fuel supply system 26 may be arranged in manners other than the exemplary manner shown in FIG. 1; e.g., fuel shut-off valve 46 may be fluidly coupled between fuel tank 42 and fuel boost pump 44 in an alternative embodiment. Fuel divider system 24 may also include various components (e.g., one or more flow divider valves, solenoid-actuated three way valves, check valves, pressurizing valves, etc.) that are well-known in the industry and not discussed herein in the interests of concision.

EV fuel return system 28 includes a fuel routing assembly 52 and an ecology valve 54. Exemplary embodiments of fuel routing assembly 52 and ecology valve 54 are described in detail below in conjunction with FIGS. 2 and 3. Fuel routing assembly 52 and ecology valve 54 are incorporated into a housing assembly (shown and labeled in FIGS. 2 and 3) having six ports: (i) a first or primary manifold inlet 56, (ii) a second or secondary manifold inlet 58, (iii) a fuel return outlet 60, (iv) a fuel drain outlet 62, (v) a reference pressure port 64, and (vi) a supply pressure port 66. A first flow passage 68 fluidly couples primary manifold outlet 56 to fuel divider system 24 and, through fuel divider system 24, to flow passage 36 and primary manifold 32. Similarly, a second flow passage 70 fluidly couples secondary manifold outlet 58 to fuel divider system 24 and, through fuel divider system 24, to flow passage 38 and secondary manifold 34. Fuel return outlet 60 and reference pressure port 64 are each fluidly coupled to fuel supply system 26 via a bifurcated flow passage 72; however, fuel return outlet 60 and reference pressure port 64 may be coupled to fuel supply system 26 via independent flow passages in alternative embodiments. Bifurcated flow passage 72 may be fluidly coupled to fuel supply system 26 at any location upstream of fuel metering valve 50 including, for example, to an inlet of fuel tank 42. In the exemplary embodiment illustrated in FIG. 1, bifurcated flow passage 72 is fluidly coupled to fuel supply system 26 at a location downstream of fuel shut-off valve 46 and upstream of fuel supply pump 48.

As indicated in FIG. 1 at 74, fuel drain outlet 62 is fluidly coupled to a low pressure source, such as ambient. During operation, fuel drain outlet 62 permits small volumes of fuel leakage to be expelled from EV fuel return system 28. Thus, to capture such fuel leakage, fuel drain outlet 62 may also be fluidly coupled to a leakage reservoir, such as a trap container that may be removed and emptied during routine maintenance of GTE 22. Alternatively, fuel drain outlet 62 may be left open and simply expel any fuel leakage overboard during operation of EV fuel return system 28.

Supply pressure port 66 of EV fuel return system 28 is fluidly coupled a servo-regulated supply pressure. The servo-regulated supply pressure may be provided by one or more servomechanisms onboard the aircraft; such servomechanisms are conventional and not shown in FIG. 1 for clarity. However, as indicated in FIG. 1 at 76, such servomechanisms may be configured to modulate the servo-regulated supply pressure in conjunction with the translational movement of fuel metering valve 50. In particular, the servomechanism or servomechanisms may be configured such that the servo-regulated supply pressure increases when fuel metering valve 50 provides a relatively large volume of metered fuel to GTE 22, as may occur during engine start-up and engine run, and decreases when fuel metering valve 50 provides little to no metered fuel to GTE 22, as may occur during engine shut-down.

During operation of fuel control assembly 20, fuel shut-off valve 46 is commanded open (e.g., by an external controller, such as a Full Authority Digital Engine Controller), fuel boost pump 44 and fuel supply pump 48 are energized, and pressurized fuel is supplied to fuel metering valve 50. Fuel metering valve 50 meters the fuel received from fuel supply pump 48, and flow passage 40 directs the metered burn fuel into fuel divider system 24. Fuel divider system 24 then apportions the metered fuel between primary manifold 32 and secondary manifold 34 of GTE 22. As noted above, fuel divider system 24 may apportion the metered fuel between manifolds 32 and 34 in accordance with a predetermined flow schedule (e.g., "quick fill logic") during engine start-up to optimize GTE operation; e.g., to achieve optimal engine light-off conditions in a timely manner. As do certain conventional ecology valve systems, EV fuel return system 28 removes a predetermined volume of fuel from at least one manifold during GTE shut-down (e.g., primary manifold 32 and secondary manifold 34 of GTE 22). Such known ecology valve systems return the withdrawn fuel directly to the GTE manifold during GTE start-up thereby potentially disrupting any predetermined flow schedule that may be carried out by fuel divider system 24. In contrast, during engine start-up, EV fuel return system 28 returns the previously-withdrawn fuel to fuel supply system 26 at a location upstream of fuel metering valve 50. In this manner, EV fuel return system 28 avoids the disruption of any predetermined flow schedule that may exist.

It is a common practice to command fuel shut-off valve 46 closed during, shortly after, or shortly before engine shut-down. When fuel shut-off valve 46 is closed, fuel flow is generally prevented from EV fuel return system 28 to fuel tank 42. EV fuel return system 28 is consequently fluidly isolated from fuel tank 42. Even if fuel shut-off valve 46 is not commanded closed during engine shut-down, or if fuel supply system 26 is not equipped with a fuel shut-off valve, fuel supply system 26 may still be unable to conduct fuel into fuel tank 42 due high system-to-tank return pressures (e.g., due to the strength of fuel boost pump 44). Thus, in these situations as well, EV fuel return system 28 is fluidly isolated from fuel tank 42 during engine shut-down. Fluid isolation of the ecology valve may prevent the proper operation of ecology valve in many conventional ecology valve systems. Specifically, hydraulic lock of the ecology valve's accumulator piston may occur as the fuel held within the ecology valve's actuator chamber is unable to be expelled from the EV system. However, as will be explained more fully below, EV fuel return system 28 does not require the expulsion of fuel to permit the movement of ecology valve 54 after GTE shut-down. Consequently, EV fuel return system 28 may function properly even when fluidly isolated from fuel tank 42 during or immediately after GTE shut-down.

Figure 2:
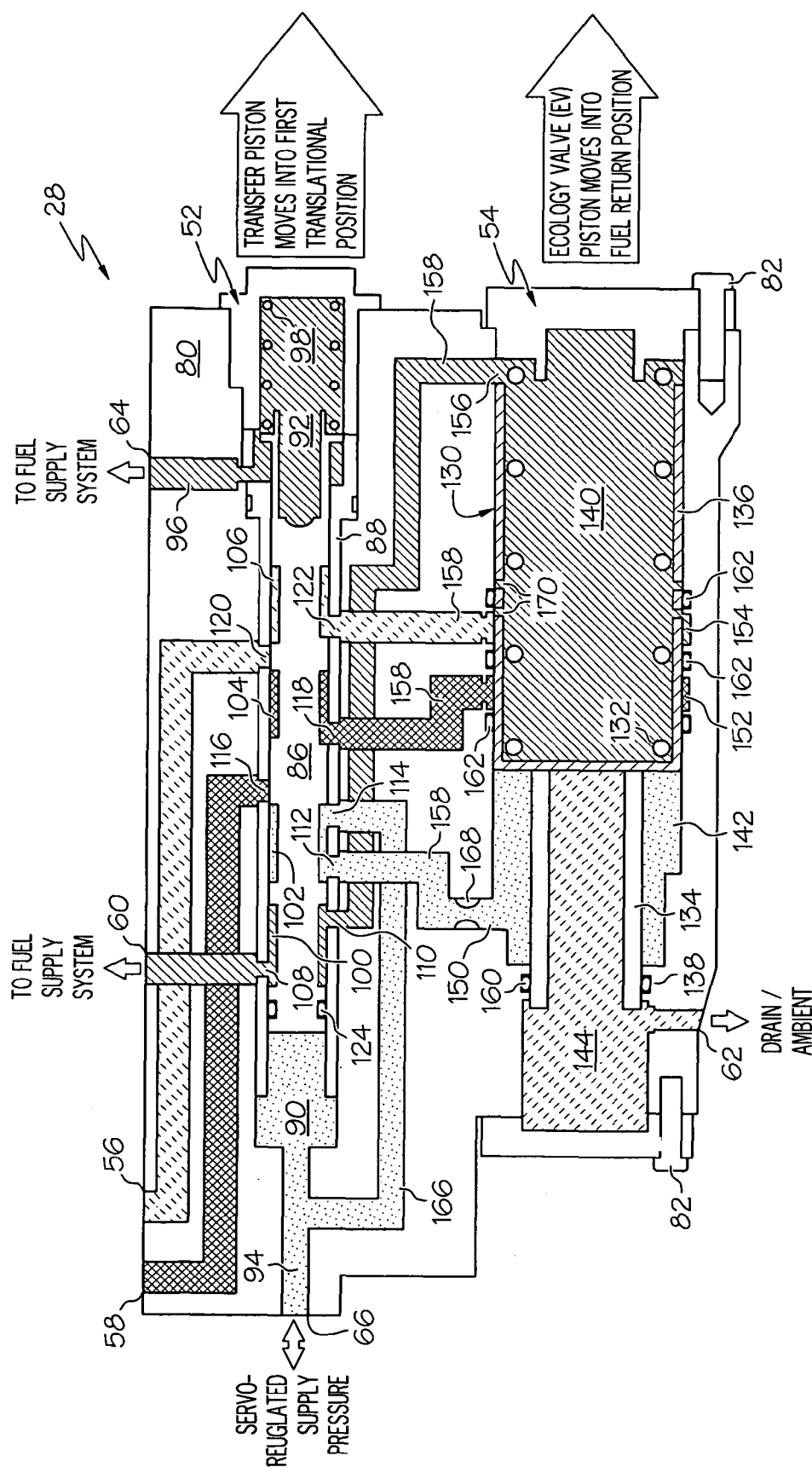
FIGS. 2 and 3 are simplified schematics of the ecology valve fuel return system shown in FIG. 1 during engine start-up and engine shut-down modes, respectively.
Figure 3:
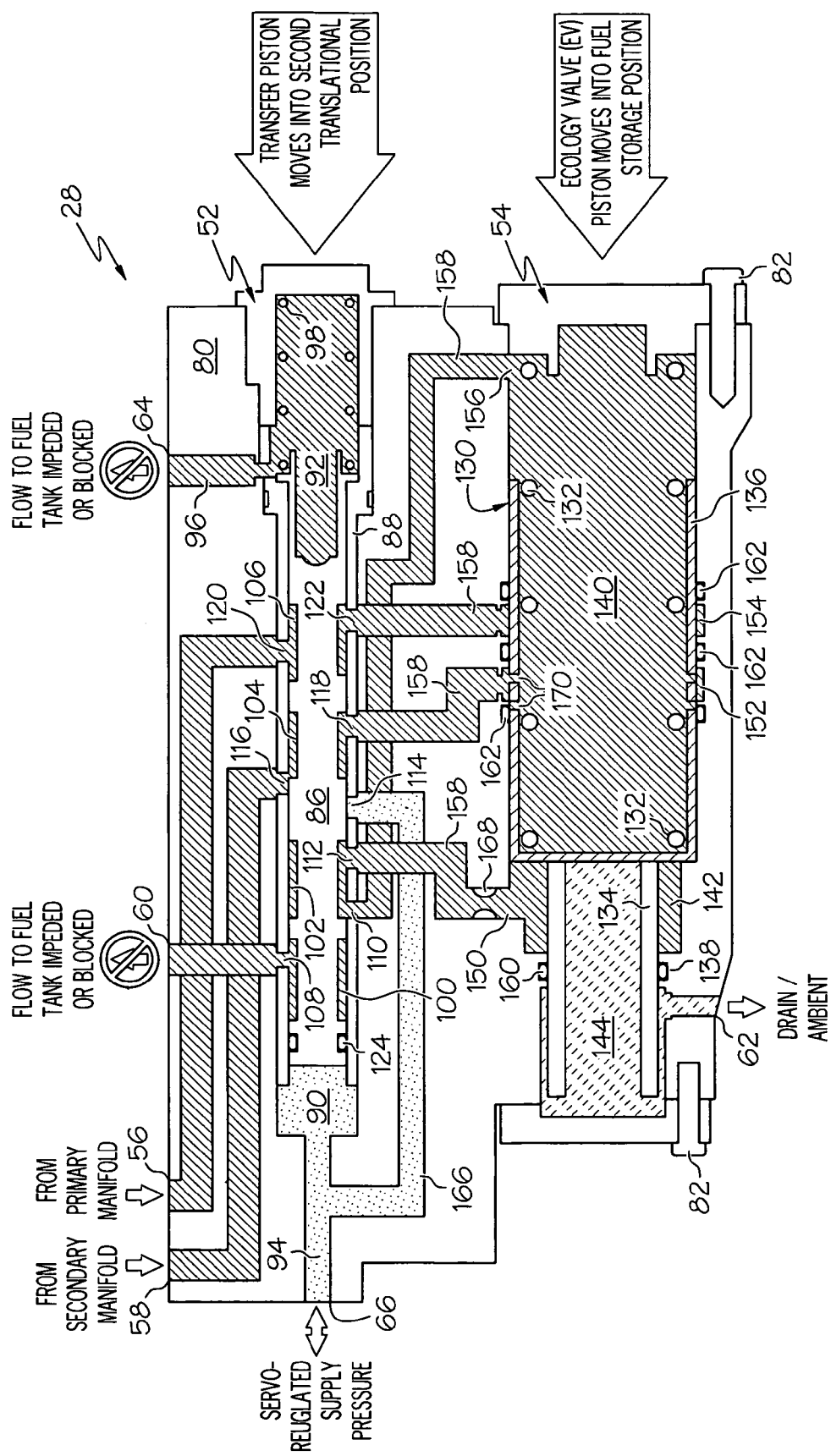

FIGS. 2 and 3 are simplified schematics of exemplary ecology valve fuel return system 28 during engine start-up and engine shut-down modes, respectively. It can be seen in FIGS. 2 and 3 that fuel routing assembly 52 and an ecology valve 54 are each mounted within a housing assembly 80. In the illustrated exemplary embodiment, housing assembly 80 is formed from a number of individual components rigidly joined together utilizing a plurality of fasteners 82 (e.g., bolts); however, housing assembly 80 may comprise any number of individual housing components, which may or may not be rigidly joined together. Housing assembly 80 includes six ports corresponding to the six ports described above in conjunction with FIG. 1; i.e., a primary manifold inlet 58, a secondary manifold inlet 56, a fuel return outlet 60, a fuel drain outlet 62, a reference pressure port 64, and a supply pressure port 66. Ports 58, 56, 60, 62, 64, and 66 are fluidly coupled to the other components of fuel control assembly 20 in the manner previously described. That is, primary manifold inlet 58 and secondary manifold inlet 56 are fluidly coupled to primary manifold 32 and secondary manifold 34, respectively, through fuel divider system 24 (FIG. 1); fuel return outlet 60 and reference pressure port 64 is fluidly coupled to fuel supply system 26; fuel drain outlet 62 is fluidly coupled to a low pressure source (e.g., ambient) and, perhaps, to a fuel leakage trap; and supply pressure port 66 is fluidly coupled to a servo-regulated supply pressure.

In the exemplary embodiment illustrated in FIGS. 2 and 3, fuel routing assembly 52 assumes the form of a transfer valve including a transfer piston 86 and a transfer sleeve 88, which is fixedly mounted within housing assembly 80. Transfer piston 86 is slidably mounted within transfer sleeve 88 and, more generally, within housing assembly 80 for movement between a first translational position (shown in FIG. 2) and a second translational position (shown in FIG. 3). Transfer piston 86 cooperates with housing assembly 80 to define a supply pressure chamber 90 and reference pressure chamber 92. Supply pressure chamber 90 is fluidly coupled to supply pressure port 66 via a first conduit 94 formed within housing assembly 80, and reference pressure chamber 92 is fluidly coupled to reference pressure port 64 via a second conduit 96 formed within housing assembly 80. A spring 98 is disposed within reference pressure chamber 92 and biases transfer piston 86 toward the second translational position (FIG. 3). The translational position of transfer piston 86 is generally determined by the force exerted on piston 86 by the fuel contained within supply pressure chamber 90 relative to the cumulative force exerted on piston 86 by spring 98 and the fuel contained within reference pressure chamber 92.

Transfer piston 86 further includes four annuli 100, 102, 104, and 106; and transfer valve 52 includes eight sidewall ports 108, 110, 112, 114, 116, 118, 120, and 122 formed through transfer sleeve 88 and within housing assembly 80. As transfer piston 86 translates within housing assembly 80, annuli 100, 102, 104, 106 fluidly couple various combinations of the sidewall ports provided through sleeve 88. More specifically, in the first translational position (FIG. 2), annulus 100 fluidly couples sidewall port 108 to sidewall port 110, and annulus 102 fluidly couples sidewall port 112 to sidewall port 114. Sidewall ports 116, 118, 120, and 122 are generally blocked by transfer piston 86 when piston 86 is in the first translational position (FIG. 2). In the second translational position (FIG. 3), annulus 102 fluidly couples sidewall ports 110 and 112, annulus 104 fluidly couples sidewall ports 116 and 118, and annulus 106 fluidly couples sidewall ports 120 and 122. Sidewall ports 108 and 114 are generally blocked by transfer piston 86 when piston 86 is in the second translational position (FIG. 3). Regardless of the particular translational position of transfer piston 86, supply pressure chamber 90 and reference pressure chamber 92 remain open to supply pressure port 66 and supply system port 64, respectively. To deter leakage between supply pressure chamber 90 and annulus 100, a dynamic seal is disposed around an outer circumferential portion of transfer piston 86 and sealingly engages an inner surface of transfer sleeve 88 as shown in FIGS. 2 and 3 at 124.

With continued reference to exemplary embodiment shown in FIGS. 2 and 3, ecology valve 54 comprises an EV piston 130 having two main portions, namely, a rod portion 134 and a head portion 136. Rod portion 134 and head portion 136 are fixedly joined and preferably machined as a unitary piece. The outer diameter of head portion 136 is greater than the outer diameter of rod portion 134. Rod portion 134 extends through an inner wall 138 provided within housing assembly 80. EV piston 130 cooperates with housing assembly 80 to define: (i) a fuel storage chamber 140; (ii) an EV control chamber 142, which is partitioned from fuel storage chamber 140 by head portion 136; and (iii) a fuel leakage chamber 144, which is partitioned from EV control chamber 142 by rod portion 134 and inner wall 138. To deter fuel leakage between EV control chamber 142 and fuel leakage chamber 144, at least one dynamic seal 160 may be mounted within inner wall 138 of housing assembly 80 and sealingly engage an outer circumferential surface of rod portion 134. However, even with the provision of dynamic seal 160, some fuel leakage may occur from EV control chamber 142 to fuel leakage chamber 144. As noted above, any such fuel leakage flows into fuel drain outlet 62, which either expels the leakage from the aircraft or directs the fuel leakage into a trap container.

EV piston 130 is slidably mounted within housing assembly 80 for movement between a fuel return position (shown in FIG. 2) and a fuel storage position (shown in FIG. 3). An ecology valve spring 132 is disposed within EV fuel storage chamber 140 and compressed between an inner wall of housing assembly 80 and an inner surface of head portion 136. EV spring 132 biases EV piston 130 toward the fuel storage position (FIG. 3). The translational position of EV piston 130 is generally determined by the force exerted on EV piston 130 by the fuel within EV control chamber 142 relative to the cumulative force exerted on EV piston 130 by EV spring 132 and the fuel within fuel storage chamber 140. As noted above in conjunction with FIG. 1, fuel leakage chamber 144 is fluidly coupled to a low pressure source, such as ambient. Thus, the force exerted on rod portion 134 of EV piston 130 by the fluid (e.g., air) within fuel leakage chamber 144 will be considered negligible for explanatory purposes.

Ecology valve 54 includes four sidewall ports 150, 152, 154, and 156. Port 150 is fluidly coupled to EV control chamber 142; and ports 152, 154, and 156 are each fluidly coupled to fuel storage chamber 140. Although ecology valve 54 is shown in two dimensional cross-section in FIGS. 2 and 3, it will be noted by the skilled practitioner that ports 152 and 154 are each defined, at least in part, by a substantially annular bore formed in an inner surface of housing assembly 80. A network of conduits 158 fluidly couples the sidewall ports of ecology valve 54, and thus chambers 140 and 142, to the sidewall ports of transfer valve 52. More specifically, conduits 158 fluidly couple: (i) port 150, and therefore EV control chamber 142, of ecology valve 54 to port 112 of transfer valve 52; (ii) port 152, and therefore fuel storage chamber 140, of ecology valve 54 to port 118 of transfer valve 52; (iii) port 154, and therefore fuel storage chamber 140, of ecology valve 54 to port 122 of transfer valve 52; and (iv) port 156, and therefore fuel storage chamber 140, of ecology valve 54 to port 110 of transfer valve 52. To prevent leakage between fuel storage chamber 140, EV control chamber 142, and the various sidewall ports of ecology valve 54, one or more dynamic seals may be mounted within housing assembly 80 and sealingly engage an outer surface of EV piston 130 as generally shown in FIGS. 2 and 3 at 162.

The operation EV fuel return system 28 will now be described in conjunction with FIGS. 2 and 3. Referring initially to FIG. 2, EV fuel return system 28 is illustrated when GTE 22 (FIG. 1) during engine start-up. At this juncture, servo-regulated supply pressure 66 is relatively high. As a result, the force exerted on transfer piston 86 by the fuel within supply pressure chamber 90 is sufficient to overcome the cumulative force exerted on transfer piston 86 by spring 98 and the fuel within reference pressure chamber 92. Transfer piston 86 has thus moved into the first translational position (FIG. 2). As noted above, in the first translational position, annulus 112 fluidly couples sidewall ports 112 and 114. Sidewall port 112 is fluidly coupled to conduit 94, and thus to the servo-regulated supply pressure, via a conduit 166. Consequently, when transfer piston 86 is in the first translational position (FIG. 2), the servo-regulated supply pressure is directed from supply pressure inlet 66; through conduit 166, sidewall port 114, annulus 102, sidewall port 112, one of the conduits 158, and port 150; and into EV control chamber 142. This results in an increase in the force exerted on EV piston 130 by the fuel within EV control chamber 142 sufficient to overcome the cumulative force exerted on EV piston 130 by spring 132 and the fuel contained within fuel storage chamber 140. EV piston 130 thus moves into the fuel return position shown in FIG. 2. To help ensure that EV piston 130 transitions from the fuel storage position (FIG. 3) to the fuel return position (FIG. 2) in a smooth and controlled manner, a rate limit bleed may be fluidly coupled between EV control chamber 142 and transfer valve 52 as generally shown in FIGS. 2 and 3 at 168.

When EV piston 130 transitions from the fuel storage position (FIG. 3) to the fuel return position (FIG. 2) during engine start-up, the fuel held within fuel storage chamber 140 (which was previously-withdrawn from manifolds 32 and 34 as described below) flows through port 156 of ecology valve 54, through one of conduits 158, and into sidewall port 110 of transfer valve 52. At this juncture, transfer piston 86 resides in the first translational position (FIG. 2). From sidewall port 110, the fuel flows through annulus 100, through sidewall port 108, and exits EV fuel return system 28 via fuel return outlet 60. Referring briefly to FIG. 1 in conjunction with FIGS. 2 and 3, the expelled fuel then flows through flow passage 72 and is ultimately returned to fuel supply system 26 at a location upstream of fuel metering valve 50. As explained above, by returning the fuel previously-withdrawn from manifolds 32 and 34 to fuel supply system during engine start-up in this manner, EV fuel return system 28 avoids the disruption of any predetermined flow schedule that may exist.

Transfer piston 86 and EV piston 130 are then maintained in the first translational position and the fuel return position, respectively, during engine run conditions.

FIG. 3 illustrates EV fuel return system 28 during shutdown of GTE 22 (FIG. 1). The servo-regulated supply pressure has decreased, and the force exerted on transfer piston 86 by the fuel within supply pressure chamber 90 is now surpassed by the force exerted on transfer piston 86 by spring 98 and by the fuel within reference pressure chamber 92. Transfer piston 86 has consequently moved into the second translational position shown in FIG. 3. When transfer piston 86 is in the second translational position (FIG. 3), transfer valve 52 no longer routes the servo-regulated supply pressure into EV control chamber 142. As a result, the fuel pressure within EV control chamber 142 decrease, EV spring 132 expands, and EV piston 130 moves into the fuel storage position (FIG. 3). Notably, when transfer piston is in the second translational position (FIG. 3), annulus 102 fluidly couples sidewall ports 110 and 112 of transfer valve 52. This permits a portion of the previously-held fuel within EV control chamber 142 to flow through port 150 of ecology valve 54, through a first of conduits 158, through sidewall port 112 of transfer valve 52, through annulus 102, through sidewall port 110 of transfer valve 52, through a second of conduits 158, and into fuel storage chamber 156. In this manner, when EV piston 130 transitions from the fuel return position (FIG. 2) to the fuel storage position (FIG. 3), the fuel expelled from EV control chamber 142 absorbed by fuel storage chamber 140. As a result, EV piston 130 may move from the fuel return position (FIG. 2) to the fuel storage position (FIG. 3) even when fuel cannot be expelled to fuel supply system 26 due to, for example, the closure of fuel shut-off valve 46 (FIG. 1) or high return pressures created by fuel boost pump 44 (FIG. 1).

As EV piston 130 moves from the fuel return position (FIG. 2) into the fuel storage position (FIG. 3), one or more sidewall apertures formed through EV piston 130 align with sidewall ports 152 and 154 of ecology valve 54; e.g., as indicated in FIGS. 2 and 3, first and second apertures 170 may align with sidewall port 152 and subsequently with sidewall port 154 as EV piston 130 moves from the fuel return position (FIG. 2) toward the fuel storage position (FIG. 3). When transfer piston 86 is in the second translational position (FIG. 3), annulus 104 fluidly couples sidewall port 118 to sidewall port 116 of transfer valve 52. In so doing, transfer valve 52 fluidly couples port 152 of ecology valve 54 to secondary manifold inlet 58 and, therefore, to secondary manifold 34 of GTE 22 (FIG. 1). Furthermore, when transfer piston 86 is in the second translational position (FIG. 3), annulus 106 fluidly couples sidewall port 122 to sidewall port 120 of transfer valve 52. In so doing, transfer valve 52 fluidly couples port 154 of ecology valve 54 to primary manifold inlet 56 and, therefore, to primary manifold 32 of GTE 22 (FIG. 1). Thus, as EV piston 130 moves from the fuel return position (FIG. 2) into the fuel storage position (FIG. 3), fuel is initially withdrawn from secondary manifold 34 (FIG. 1), through secondary manifold inlet 58 and transfer valve 52, and into fuel storage chamber 140; and fuel is subsequently withdrawn from primary manifold 32 (FIG. 1), through primary manifold inlet 56 and transfer valve 52, and into fuel storage chamber 140. When piston 130 has moved fully into the fuel storage position shown in FIG. 3 upon or shortly after shutdown of GTE 22 (FIG. 1), EV fuel return system 28 has thus removed a predetermined volume of fuel from primary manifold 32 and secondary manifold 34. In addition, and as noted above, a portion of the fuel previously held within EV control chamber 142 has also be received within fuel storage chamber 140.

It should thus be appreciated that there has been provided an exemplary embodiment of an ecology valve fuel return system: (i) that avoids disruption of a predetermined flow schedule when returning fuel withdrawn from one or more fuel manifolds, and (ii) that is operable even when fluidly isolated from the fuel supply system, and specifically the fuel tank, during GTE shut-down. While described above in conjunction with a GTE employing two manifolds, embodiments of the EV fuel return system may also be utilized in conjunction with a single manifold GTE or with a GTE employing three or more manifolds. In addition, embodiments of the EV fuel return system may be utilized in conjunction with a GTE employing two or more sets of nozzles (e.g., a first set of air blast nozzles and a second set of atomizer nozzles). Furthermore, alternative embodiments of the EV fuel return system may employ two or more ecology valves; e.g., certain embodiments of the EV fuel return system may include a first ecology valve that is fluidly coupled to and withdraws fuel from a primary GTE manifold, as well as a second ecology valve that is fluidly coupled to and withdraws fuel from a secondary GTE manifold. Furthermore, although assuming the form of a transfer valve in the foregoing embodiment, the fuel routing assembly may assume any form suitable for selectively routing fuel withdrawn from one or more fuel manifolds in the above-described manner. However, if the fuel routing assembly does assume the form of a transfer piston, the transfer piston is by no means required to be hydraulically-actuated; in alternative embodiments, the transfer piston may be configured to be actuated utilizing a pneumatic or electronic means, such as a solenoid.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. An ecology valve (EV) fuel return system for use in conjunction with a fuel supply system and a gas turbine engine (GTE) including at least a first fuel manifold, the EV fuel return system comprising:
    a housing assembly;
    an ecology valve, comprising:
        an EV piston slidably disposed within the housing assembly for movement between a fuel storage position and a fuel return position;
        a fuel storage chamber defined by the EV piston and the housing assembly; and
        an EV control chamber defined by the EV piston and the housing assembly, the fuel within the EV control chamber acting on the EV piston in opposition to the fuel within the fuel storage chamber; and
    a fuel routing assembly fluidly coupled to the EV control chamber and to the fuel storage chamber, the fuel routing assembly routing fuel: (i) from the fuel storage chamber to the fuel supply system when the GTE is in a start-up mode, and (ii) from the first fuel manifold and from the EV control chamber to the fuel storage chamber when the GTE is in a shut-down mode.

2. An EV fuel return system according to claim 1 wherein the ecology valve is configured to move from the fuel storage position toward the fuel return position when the GTE is in the start-up mode.

3. An EV fuel return system according to claim 2 wherein the ecology valve is configured to move from the fuel return position toward the fuel storage position when the GTE is in the shut-down mode.

4. An EV fuel return system according to claim 1 wherein the ecology valve further comprises a spring disposed within the fuel storage chamber and biasing the EV piston toward the fuel storage position.

5. An EV fuel return system according to claim 1 wherein the EV piston comprises:
    a rod portion; and
    a head portion fixedly coupled to the rod portion and having an outer diameter greater than that of the rod portion.

6. An EV fuel return system according to claim 5 wherein the head portion generally partitions the fuel storage chamber from the EV control chamber.

7. An EV fuel return system according to claim 5 wherein the EV fuel return system is further configured to be utilized in conjunction with a low pressure source, and wherein the housing assembly comprises:
    a fuel drain port configured to be fluidly coupled to the predetermined low pressure source; and
    an inner wall through which the rod portion is slidably mounted.

8. An EV fuel return system according to claim 7 further comprising a fuel leakage chamber defined by the housing assembly and the rod portion, the fuel leakage chamber fluidly coupled to the fuel drain port.

9. An EV fuel return system according to claim 8 wherein the inner wall and the rod portion cooperate to generally partition the EV control chamber from the fuel drain port while directing fuel leakage from the EV control chamber into the fuel leakage chamber to the fuel drain port.

10. An EV fuel return system according to claim 1 wherein the fuel routing assembly comprises a transfer valve.

11. An EV fuel return system according to claim 1 wherein the gas turbine engine (GTE) further includes a second fuel manifold, and wherein the fuel routing assembly is further configured to route fuel from the second fuel manifold into the fuel storage chamber when the GTE is in a shut-down mode.

12. An EV fuel return system according to claim 1 wherein the EV piston includes at least one sidewall aperture, and wherein ecology valve further comprises a sidewall port configured to be fluidly coupled to the first fuel manifold through the fuel routing assembly, the sidewall aperture aligning with the sidewall port as the EV piston moves from the fuel storage position to the fuel return position.

13. An ecology valve (EV) fuel return system for use in conjunction with a fuel supply system and a gas turbine engine (GTE) including at least a first fuel manifold, the EV fuel return system comprising:
    a housing assembly having a fuel return outlet and a first manifold inlet configured to be fluidly coupled to the fuel supply system and to the first fuel manifold, respectively;
    an EV piston slidably disposed within the housing assembly and movable between a fuel storage position and a fuel return position, the EV piston cooperating with the housing assembly to define a fuel storage chamber and an EV control chamber therein; and
    a fuel routing assembly fluidly coupled to the fuel storage chamber, the EV control chamber, the first manifold inlet, and the fuel return outlet, the fuel routing assembly routing fuel: (i) from the fuel storage chamber to the fuel return outlet when the GTE is in a start-up mode, and (ii) from the EV control chamber and from the first manifold inlet into the fuel storage chamber when the GTE is in a shut-down mode.

14. An EV fuel return system according to claim 13 wherein the fuel routing assembly comprises a transfer piston slidably mounted within the housing assembly, the transfer piston configured to move into a first translational position when the GTE is in the start-up mode and into a second translational position when the GTE is in the shut-down mode.

15. An EV fuel return system according to claim 14 wherein the transfer piston fluidly couples the fuel storage chamber: (i) to the fuel return outlet in the first translational position, and (ii) to the first manifold inlet and to the EV control chamber in the second translational position.

16. An EV fuel return system according to claim 15 wherein the EV fuel return system is further configured to be utilized in conjunction with a servo-regulated supply pressure, and wherein the transfer piston is configured to fluidly couple the EV control chamber to the servo-regulated supply pressure in the first translational position.

17. An EV fuel return system according to claim 16 further comprising a spring biasing the transfer piston toward the second translational position, and wherein the servo-regulated supply pressure acts on the transfer piston in opposition to the spring.

18. A fuel control assembly for use in conjunction with a gas turbine engine (GTE) having at least a first fuel manifold, the fuel control assembly comprising:
   a fuel supply system configured to supply pressurized fuel to the first fuel manifold; and
   an ecology valve (EV) fuel return system, comprising:
      a housing assembly having a fuel return outlet and a first manifold inlet, the fuel return outlet fluidly coupled to the fuel supply system and the first manifold inlet configured to be fluidly coupled to the first fuel manifold;
      an EV piston slidably disposed within the housing assembly and movable between a fuel storage position and a fuel return position, the EV piston cooperating with the housing assembly to define a fuel storage chamber and an EV control chamber therein; and
      a fuel routing assembly fluidly coupled to the fuel storage chamber, the EV control chamber, the first manifold inlet, and the fuel return outlet, the fuel routing assembly fluidly coupling: (i) the fuel storage chamber to the fuel return outlet to direct fuel flow from the fuel storage chamber to the fuel return outlet when the GTE is in a start-up mode, and (ii) the EV control chamber, the first manifold inlet, and the fuel storage chamber to direct fuel flow from the EV control chamber and from the first manifold inlet into the fuel storage chamber when the GTE is in a shut-down mode.

19. A fuel control assembly according to claim 18 wherein the fuel supply system comprises a fuel metering valve, and wherein the EV fuel return system is configured to return fuel withdrawn from the first fuel manifold to the fuel supply system at a location upstream of the fuel metering valve when the GTE is in a start-up mode.

20. A fuel control assembly according to claim 18 wherein the GTE further includes a second fuel manifold, and wherein the fuel control assembly further comprises a fuel divider system fluidly coupled to the fuel supply system and configured to apportion fuel between first fuel manifold and the second fuel manifold.

* * * * *